United States Patent [19]

Stewart

[11] Patent Number: 5,808,761
[45] Date of Patent: Sep. 15, 1998

[54] PATH INTEGRITY PROVING IN OPTICAL COMMUNICATIONS SYSTEMS

[75] Inventor: William James Stewart, Blakesley, United Kingdom

[73] Assignee: GEC-Marconi Limited, United Kingdom

[21] Appl. No.: 811,139

[22] Filed: Mar. 3, 1997

Related U.S. Application Data

[63] Continuation of Ser. No. 403,731, Mar. 27, 1995, abandoned.

[30] Foreign Application Priority Data

Jul. 15, 1993 [GB] United Kingdom ................... 9314942

[51] Int. Cl.$^6$ ..................................................... H04J 14/02
[52] U.S. Cl. .......................... 359/110; 359/130; 356/73.1
[58] Field of Search ..................................... 357/110, 173, 357/130, 167; 356/73.1

[56] References Cited

U.S. PATENT DOCUMENTS

| | | | |
|---|---|---|---|
| 4,768,849 | 9/1988 | Hicks, Jr. .............................. | 350/96.15 |
| 4,961,644 | 10/1990 | Marsden ................................. | 356/73.1 |
| 5,177,354 | 1/1993 | Tomita et al. ..................... | 250/227.15 |
| 5,187,362 | 2/1993 | Keeble ................................... | 356/73.1 |
| 5,285,305 | 2/1994 | Cohen et al. .......................... | 359/110 |
| 5,357,333 | 10/1994 | DeBernardi et al. .................. | 356/73.1 |
| 5,412,464 | 5/1995 | Thomas et al. ........................ | 350/73.1 |

FOREIGN PATENT DOCUMENTS

| | | | |
|---|---|---|---|
| 0 486 931 A1 | 5/1992 | European Pat. Off. ........ | H04B 10/20 |
| 2190264 | 11/1987 | United Kingdom .............. | G01S 7/48 |
| WO 90/06498 | 6/1990 | WIPO ............................ | G01M 11/00 |
| WO 91/15906 | 10/1991 | WIPO ............................. | H04J 14/02 |

*Primary Examiner*—Rafael Bacares
*Attorney, Agent, or Firm*—Kirschstein, et al.

[57] ABSTRACT

A method of proving the integrity of optical paths in an optical communication system wherein the same diagnostic optical signal is transmitted along each path from one end, and each path is provided at its other end with a grating pattern, for example, for producing a pattern of time spaced echoes of the diagnostic signal unique to that path. In one particular embodiment the diagnostic signal comprises an amplitude modulated optical signal and the echoes are produced at a time spacing such that the modulation components of the echoes are in-phase at a different frequency for each path.

14 Claims, 4 Drawing Sheets

MAIN TERMINAL

SATELLITE TERMINALS

REFLECTOR (GRATING)    REFLECTOR (GRATING)    SATELLITE TERMINAL

PATH INTEGRITY PROVING IN OPTICAL COMMUNICATIONS SYSTEMS

This application is a file wrapper continuation of application Ser. No. 08/403,731, filed Mar. 27, 1995 now abandoned.

BACKGROUND OF THE INVENTION

This invention relates to optical communication systems.

More particularly the invention relates to methods and apparatus for proving the integrity of optical paths in an optical communication system.

A known such method is to build into terminal equipment at the end of each path the ability to respond in predetermined manner to a diagnostic optical signal transmitted thereto from the other end of the path, detection of the response at the other end being taken as proof of the path integrity. One difficulty which arises with such a method is that it may not be possible to distinguish between a failure in the terminal equipment and an optical path failure.

One solution to this difficulty is to provide a passive device in the form of an optical reflector means at the end of each path, each reflector means being tuned to a different optical frequency, detection of the reflection of a diagnostic optical signal of that frequency being taken as proof of the integrity of that path. The problem with this solution is that it uses too much bandwidth, especially because of temperature stability limitations.

SUMMARY OF THE INVENTION

It is an object of the present invention to provide a method and apparatus whereby this problem is overcome.

According to the present invention there is provided a method for proving the integrity of optical paths in an optical communication system comprising: transmitting a diagnostic optical signal along each path from one end; producing at the other end of each said path a plurality of echoes of said diagnostic signal; and detecting at said one end said echoes of said diagnostic signal; the diagnostic signal in each path having the same optical frequency but the time spacing of the echoes in each path being different.

According to a second aspect of the invention there is provided an apparatus for proving the integrity of optical paths in an optical communication system comprising: transmitting means for transmitting a diagnostic signal of a predetermined optical frequency along each said path from one end thereof; echo producing means for producing time-spaced echoes of the diagnostic signal at the other end of each path, the time spacing of the echoes produced in each path being different, and detection means for detecting said time-spaced echoes at said one end of each path.

In one particular embodiment of the invention said diagnostic optical signal is an amplitude modulated optical signal and the time spacing of the echoes in each path is such that the modulation components of the echoes are in-phase at a different modulating frequency for each path.

In one such particular embodiment the echoes are produced by a pair of strong reflector means spaced by a distance equal to half the wavelength of the modulating frequency, the reflector means nearer the source of the diagnostic signal being partly transmissive so that the pair of reflectors operate in the manner of a Fabry-Perot resonator tuned to the modulating frequency. In such an arrangement the reflector means are preferably tuned to the optical frequency of the diagnostic signal.

In another such particular embodiment of the invention the echoes are produced by a closed optical loop of length equal to the wavelength of the modulating frequency or a multiple thereof.

In another particular embodiment of the invention said diagnostic signal is in the form of a pulse at said optical frequency and said echoes constitute a train of echo pulses having a unique time spacing for each path. In such an arrangement the echoes are preferably formed by a series of weak reflector means positioned along the path at spacings corresponding to the time spacings of the pulses in the echo pulse train required to be produced in that path by the diagnostic signal.

BRIEF DESCRIPTION OF THE DRAWINGS

Two methods in accordance with the invention and apparatus for carrying out the methods will now be described, by way of example, with reference to the accompanying drawings in which.

DETAILED DESCRIPTIONS OF THE PREFERRED EMBODIMENTS

Figure 1:
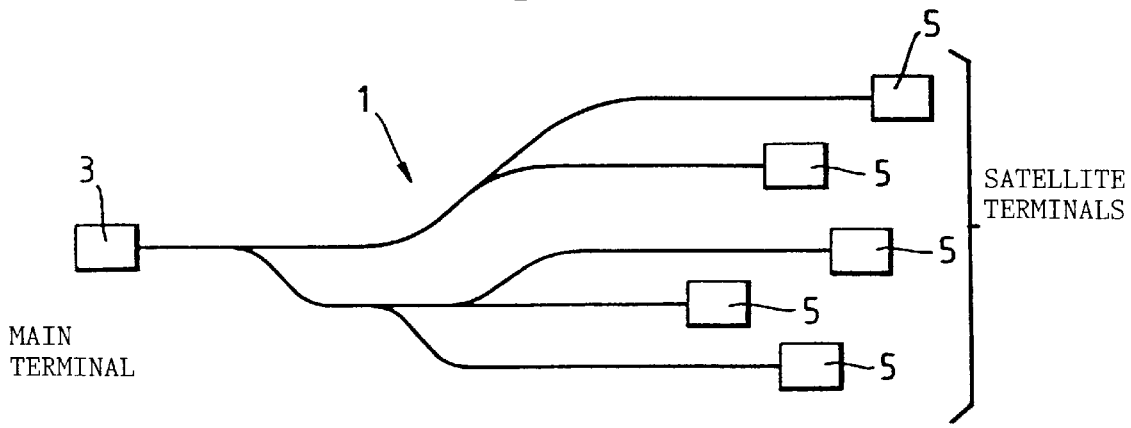
FIG. 1 is a schematic diagram of a multi-terminal optical fibre communication system.

Referring to FIG. 1, the system comprises a fibre optic network 1 which connects a main terminal 3 via the network to each of a number of satellite terminals 5.

In order to prove the integrity of the paths between the main terminal 3 and each of the terminals 5 the terminal 3 transmits an optical diagnostic signal.

In the first method to be described the diagnostic signal comprises a signal of a predetermined optical frequency, e.g. of the order of $2 \times 10^{14}$ Hz, which is amplitude modulated at a frequency which is swept linearly through a band of frequencies, typically in the range from 100 MHz to 1 GHz.

Figure 2:
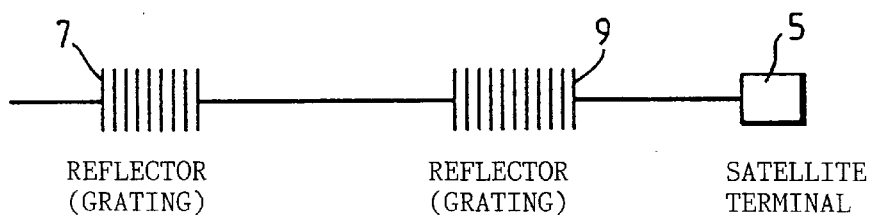
FIG. 2 is a schematic diagram of reflector means at the terminal end of a path of the system of FIG. 1 in a first embodiment of the invention.

Referring to FIG. 2, at the terminal end of each path there is provided a device for producing time spaced echoes in response to the diagnostic signal comprising a pair of spaced strong reflector means 7 and 9. Each of the reflector means 7, 9 suitably comprises an optical grating structure, as illustrated in FIG. 2, the spacing of the lines in each grating being half the wavelength of the predetermined optical frequency of the diagnostic signal so that the grating operates as a reflector tuned to that frequency.

The two reflector means 7, 9 in each path are spaced from one another by a different distance for each path such that the double pass delay between the reflector means in each path has a different value equal to the period of a different frequency in the modulation frequency band.

The sum of the reflections of the diagnostic signal produced by the reflector means 7, 9 in any particular path can be calculated using a Fabry-Perot type calculation, assuming the diagnostic signal source to be incoherent and 100% modulation depth, as follows:

Taking the modulation envelope of the transmitted diagnostic signal at the reflector means 7 nearer the main terminal 3 to be given by Exp $i(wt-kz)+1$, where t is time, w is the angular frequency of the modulating signal and kz is a phase factor, the sum of the reflections is given by:

$$R\{\text{Exp}[i(wt - kz)] + 1\} + \quad (1)$$
$$T^2B\{\text{Exp}[i(wt - kz - kL)] + 1\} +$$
$$RT^2B^2\{\text{Exp}[i(wt - kz - 2kL)] + 1\} +$$
$$R^2T^2B^3\{\text{Exp}[i(wt - kz - 3kL)] + 1\} + \ldots$$

where L is the double pass delay, R is the reflectivity of the reflector means 7, T(=1−R) is the transmissivity of the reflector means 7, and B is the reflectivity of the reflector means 9.

The sum (1) can be split into a DC component given by $$R+T^2B+RT^2B^2+R^2T^2B^3+ \quad (2)$$

and an alternating component given by $$\text{Exp}[i(wt-kz)]\{R+T^2B\,\text{Exp}[i(-kL)]+RT^2B^2\text{Exp}[i(-2kL)]+ \\ R^2T^2B^3\text{Exp}\,[i(-3kL)]+ \ldots \} \quad (3)$$

which becomes $$R-T^2/R+T^2/R\{1/(1-\{RB\,\text{Exp}[i(-kL)]\})\} \quad (4)$$

and which is equal to the DC component (2) when L=0

Figure 3A:
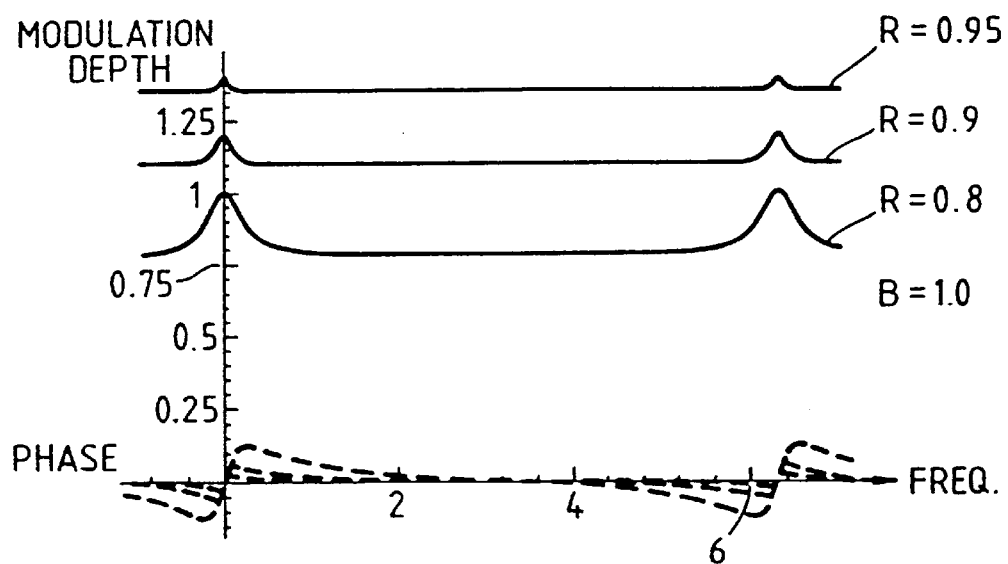
FIGS. 3A, 3B and 4 illustrate the waveforms of reflection signals produced by the reflector means of FIG. 2.
Figure 3B:
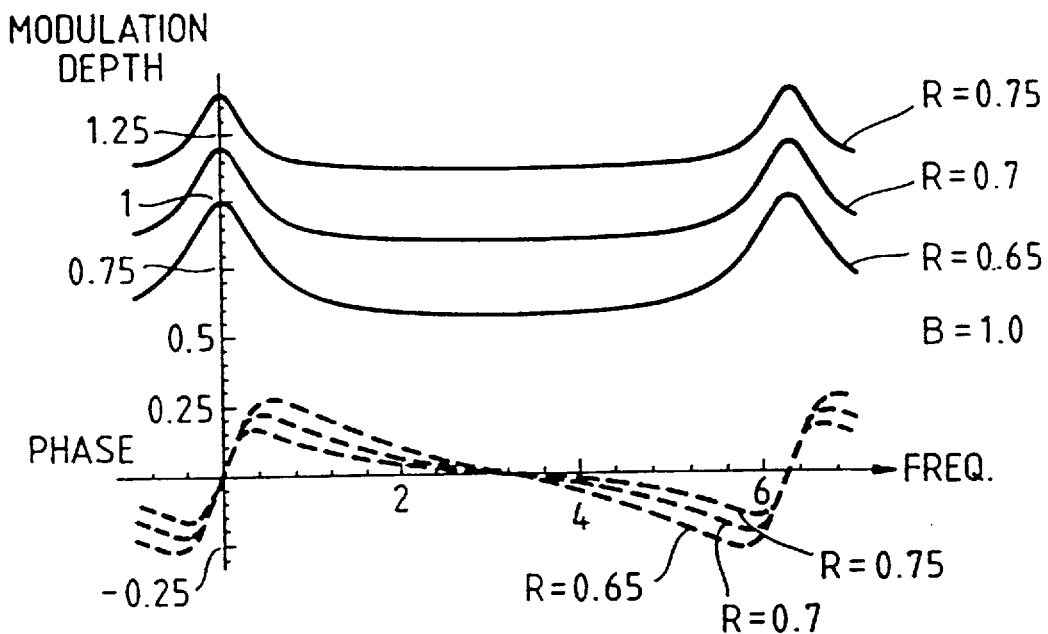

FIGS. 3A and 38 illustrate the variation of the depth of modulation and the phase of the sum of the reflections with variation of modulating frequency for different values of the reflectivity R and a value of B of one. In the FIGS. 3A, 3B the depth of modulation curves are vertically spaced, for the sake of clarity but, in fact, all the curves peak at the same value (i.e. at a value at which the depth of modulation of the sum of the reflections is equal to the depth of modulation of the diagnostic signal) as shown for the curves for reflectivities of 0.8 and 0.65.

Figure 4:
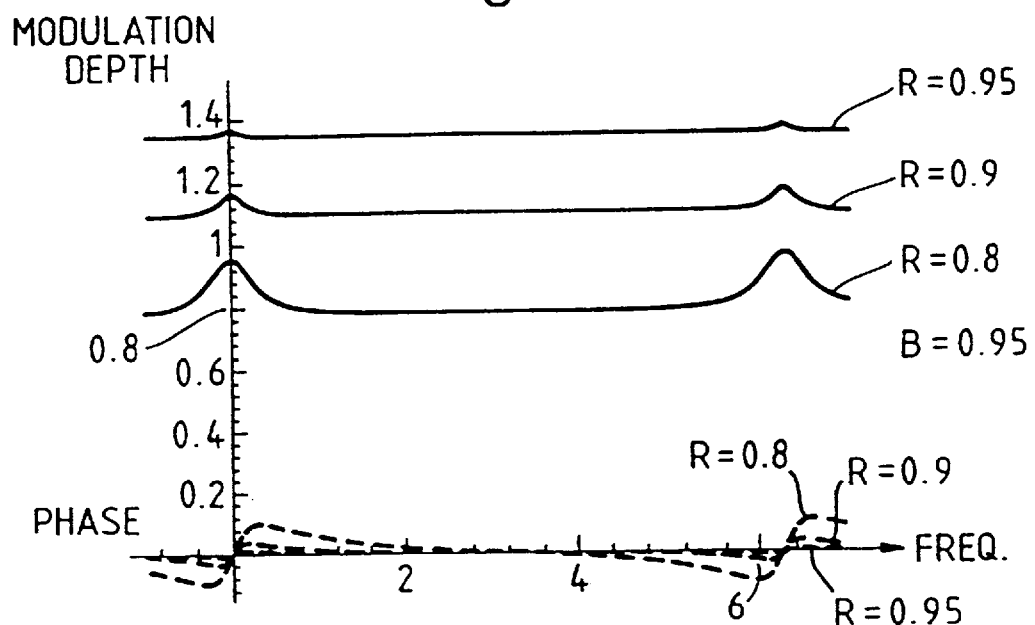

FIG. 4 shows similar curves for reflectivities R of reflector means 7 of values 0.95, 0.90 and 0.80 and a reflectivity B of reflection means 9 of value 0.95, the peak value of these curves, of course, being less than in FIG. 3A.

As can be seen from FIGS. 3 and 4, the depth of modulation of the sum of the reflections periodically peaks in each curve with increasing frequency, the peaks occurring at values of the modulating frequency for which the period of the modulating frequency is an integral multiple of L, i.e. at values of the modulating frequency for which the spacing of the reflector means 7 and 9 is equal to an integral multiple of half the wavelength of the modulating frequency.

The sharpness of the modulation depth peaks decreases with decreasing reflectivity R whilst the amplitude of the peaks increases with decreasing reflectivity R and decreases with decreasing reflectivity B. With appropriate choice of R and B, up to about fifty different peaks may be distinguished, i.e. up to fifty different modulating frequencies may be identified.

The integrity of any particular path in the system can thus be proved by determining whether the depth of modulation of the sum of the reflected signals produced at the main terminal 3 in response to transmission from terminal 3 of a diagnostic signal having a modulation frequency corresponding to the spacing of the reflector means 7 and 9 at the terminal end of that path exceeds a predetermined value.

In practice, proving path integrity will involve detecting and analysing, at the main terminal 3, the reflection signals produced by sweeping the modulating frequency of the diagnostic signal through the above-mentioned modulating frequency band, and thereby determining those modulating frequencies present in the reflection signals for which the depth of modulation of the reflected signals exceeds the predetermined value. Each such modulating frequency corresponds to a different path of the system, and a determination that the depth of modulation of the reflected signals for a particular modulating frequency exceeds the predetermined value proves the integrity of the corresponding path.

As shown in FIGS. 3 and 4, in addition to the depth of modulation of the sum of the reflections exhibiting peaks at particular modulating frequencies dependent on the spacing of reflection means 7 and 9, the rate of change of the phase of the sum of the reflections also exhibits peaks at particular modulating frequencies. Hence, in order to prove path integrities, instead of determining the modulating frequencies at which the depth of modulation of the reflection signals exceeds a predetermined value, the modulating frequencies at which the rate of change of phase of the reflection signals with change of modulating frequency exceeds a predetermined value may be determined.

Figure 5:
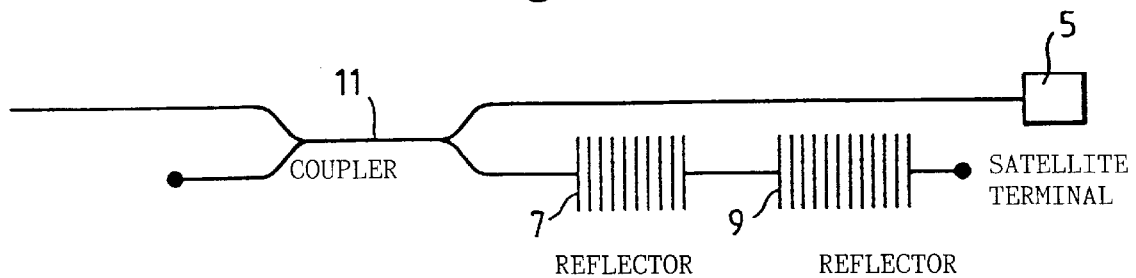
FIG. 5 illustrates an alternative arrangement of the reflector means of FIG. 2.
Figure 6:
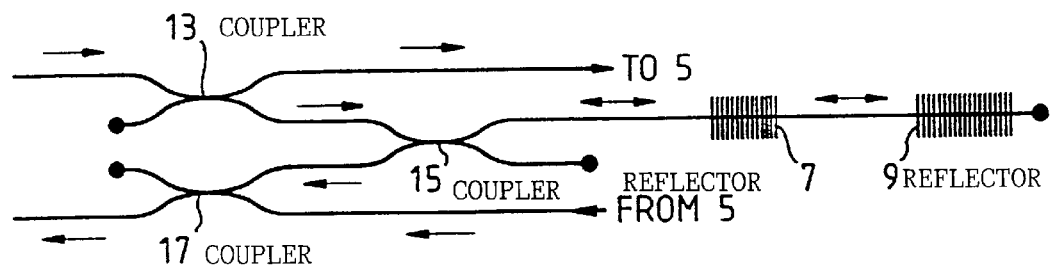
FIGS. 6 and 7 illustrate alternative arrangements of the reflector means of FIG. 2 in a two-fibre optical path system.
Figure 7:
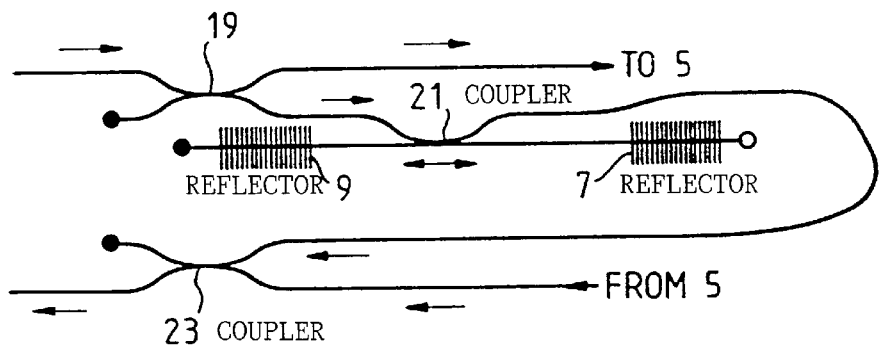

It will be appreciated that if the optical frequency chosen for the diagnostic signal is outside the range of optical frequencies to be received and/or transmitted by the terminal means 5, the reflector means 7, 9 associated with a terminal 5 may be positioned directly in the optic fibre path connecting the terminal 5 into the system, as shown in FIG. 2. However, to avoid this restriction the reflector means 7, 9 may be coupled into the terminal path via a 3 db coupler 11 as illustrated in FIG. 5.

Where it is desired that each terminal 5 is connected by separate receive and transmit fibres, the reflector means 7 and 9 may be connected in various configurations. One such configuration is shown in FIG. 6 where 13, 15 and 17 are 3 db couplers. A second such configuration is shown in FIG. 7 where 19, 21 and 23 are 3 db couplers.

Figure 8:
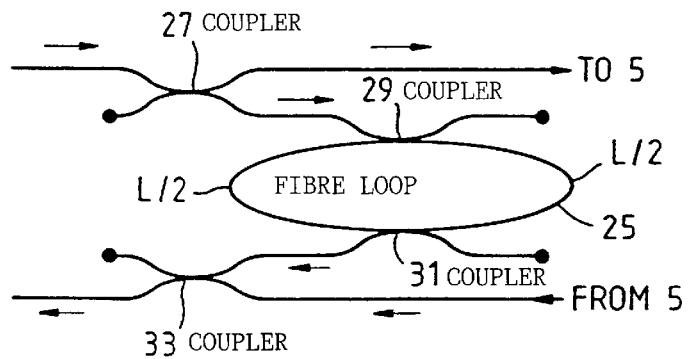
FIGS. 8 and 9 illustrate an alternative form of the reflector means in the first embodiment of the invention.

In the above described embodiments, instead of using spaced reflector means 7, 9 to produce the required time-spaced echoes of the diagnostic signal, the echoes may be produced by closed fibre loops of a length such as to produce the required delay L. FIG. 8 illustrates one such arrangement, functionally corresponding to the arrangement of FIG. 6, using a fibre loop 25 and four 3 db couplers 27, 29, 31 and 33, and FIG. 9 illustrates a second such arrangement, functionally corresponding to the arrangement of FIG. 7, using a fibre loop 35 and three 3 dbs couplers 37, 39 and 41.

Figure 9:
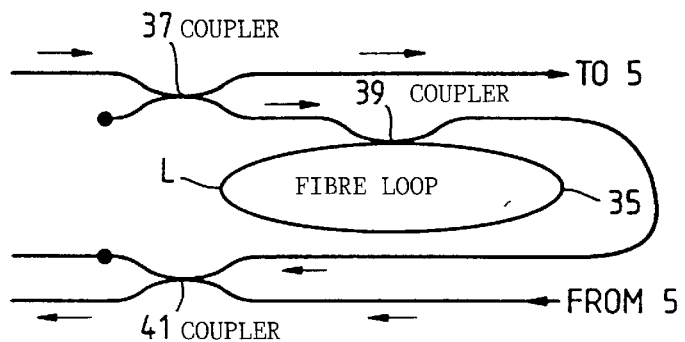

It will be appreciated that arrangements using closed optical fibre loops, as illustrated in FIGS. 8 and 9 are broadband devices in the sense that they operate over a wide band of optical frequency without modification.

Figure 10:
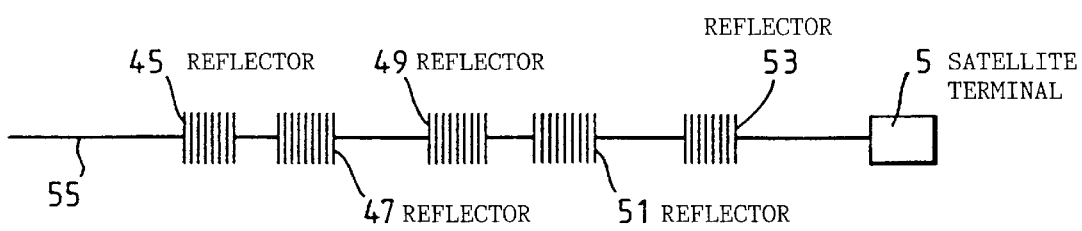
FIG. 10 illustrates the reflector means of the second embodiment of the invention.

Referring now to FIG. 10, in the second embodiment to be described the diagnostic signal comprises a narrow pulse of predetermined optical frequency and the time spaced echoes are produced by a series of low reflectivity, e.g. 2%, reflector means 45, 47, 49, 51 and 53 disposed at spaced positions at the terminal end of the fibre path 55 whose integrity is to be proved, the reflector means spacings being different for each path to be proved. Each reflector means suitably comprises a grating.

In response to each diagnostic signal pulse the reflector means 45 to 53 produce a train of reflected pulses at time spacings corresponding to the physical spacings of the reflector means. It will be appreciated that this train is constituted by the first reflections at each reflector means, subsequent reflections being of relatively negligible amplitude.

The integrity of any particular path 55 is proved by the detection at the main terminal 3 end of that path 55 of a train of pulses corresponding to the spacings of the reflector means 45 to 53 in that path 55.

The spacings of the reflector means are suitably chosen so that the reflections of a diagnostic signal pulse from the reflector means 47 to 53 are at time delays with respect to the reflection of that pulse from the reflector means 45 which are different integral multiples of the duration of the diagnostic signal pulse. The reflected signal for each path then exhibits a series of time slots of a duration equal to the duration of a diagnostic signal pulse, in each of which slots a reflected pulse is present or absent. Hence, the train of reflected pulses in each path can then be considered as a representation of a binary number where the presence of a reflected pulse represents 1 and the absence of a reflected pulse represents 0, or vice versa.

In order to facilitate the separate detection of the different trains which will be produced in overlapping relationship in a multi-terminal system, the spacings of the reflector means are chosen in accordance with known techniques such as the code division multiple access (CDMA) technique.

I claim:

1. A method of proving the integrity of each of a plurality of optical paths interconnected to a main terminal of an optical communications system, comprising the steps of:

a) amplitude-modulating, at the main terminal, a diagnostic optical signal having a predetermined optical frequency with a modulation frequency lying within a band of modulation frequencies;

b) transmitting the amplitude-modulated diagnostic signal from the main terminal along each said optical path to an end terminal of each said optical path;

c) producing, at each end terminal, a plurality of distinct and distinguishable echoes at a time spacing in each said optical path in response to the transmitting step, each time spacing between the echoes in each said optical path being different;

d) sweeping, at the main terminal, the modulation frequency through said band; and e) detecting, at the main terminal, which of the modulation frequencies are present in the echoes, each time spacing corresponding to a different one of the detected modulation frequencies and, in turn, to a different one of the optical paths in order to prove the integrity thereof.

2. The method according to claim 1, wherein the detecting step is performed by comparing the phases of the echoes at the detected modulation frequency for each said optical path.

3. The method according to claim 1, wherein the producing step is performed by positioning a pair of reflectors apart at a physical spacing in each said optical path, said physical spacing being equal to one-half of a wavelength of the modulation frequency.

4. The method according to claim 3; and further comprising the step of tuning each reflector to the predetermined optical frequency.

5. The method according to claim 4, wherein each reflector is an optical grating having grating lines.

6. The method according to claim 3, wherein the reflector in each said optical path that is closer to the main terminal is partly transmissive, and wherein the pair of reflectors operate as a Fabry-Perot resonator tuned to the modulating frequency.

7. The method according to claim 1, wherein the producing step is performed by conducting the diagnostic signal along a closed optical loop whose length equals a wavelength of the modulation frequency or a multiple thereof.

8. An apparatus for proving the integrity of each of a plurality of optical paths interconnected to a main terminal of an optical communications system, comprising:

a) means for amplitude-modulating, at the main terminal, a diagnostic optical signal having a predetermined optical frequency with a modulation frequency lying within a band of modulation frequencies;

b) means for transmitting the amplitude-modulated diagnostic signal from the main terminal along each said optical path to an end terminal of each said optical path;

c) means for producing, at each end terminal, a plurality of distinct and distinguishable echoes at a time spacing in each said optical path in response to the transmitting means, each time spacing between the echoes in each said optical path being different;

d) means for sweeping, at the main terminal, the modulation frequency through said band; and e) means for detecting, at the main terminal, which of the modulation frequencies are present in the echoes, each time spacing corresponding to a different one of the detected modulation frequencies and, in turn, to a different one of the optical paths in order to prove the integrity thereof.

9. The apparatus according to claim 8, wherein the detecting means is operative for comparing the phases of the echoes at the detected modulation frequency for each said optical path.

10. The apparatus according to claim 8, wherein the producing means includes a pair of reflectors spaced apart at a physical spacing in each said optical path, said physical spacing being equal to one-half of a wavelength of the modulation frequency.

11. The apparatus according to claim 10, wherein each reflector is tuned to the predetermined optical frequency.

12. The apparatus according to claim 11, wherein each reflector is an optical grating having grating lines.

13. The apparatus according to claim 10, wherein the reflector in each said optical path that is closer to the main terminal is partly transmissive, and wherein the pair of reflectors operate as a Fabry-Perot resonator tuned to the modulating frequency.

14. The apparatus according to claim 8, wherein the producing means includes a closed optical loop whose length equals a wavelength of the modulation frequency or a multiple thereof.

* * * * *